April 2, 1963     E. A. STALKER     3,083,446
ROTOR CONSTRUCTION
Original Filed June 14, 1950     2 Sheets-Sheet 1
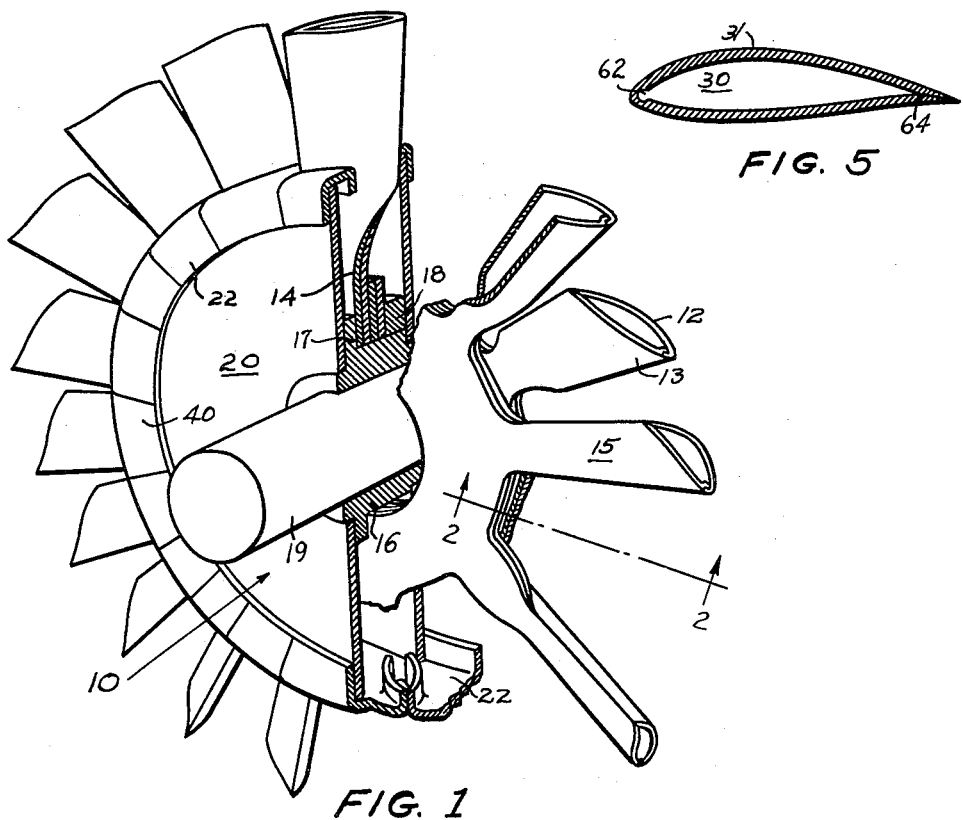
FIG. 1
FIG. 5
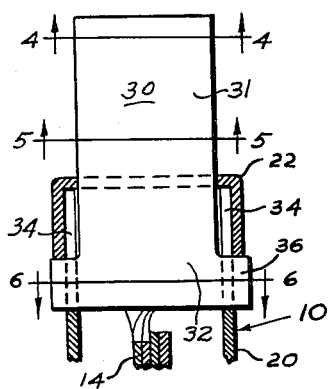
FIG. 2
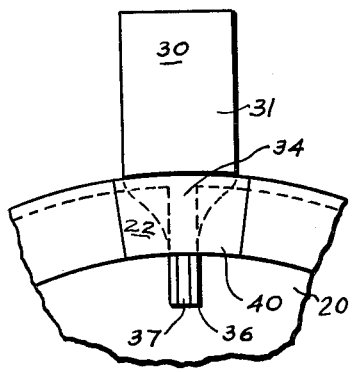
FIG. 3
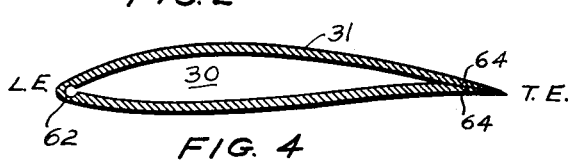
FIG. 4
INVENTOR.
Edward A. Stalker
ATTORNEYS April 2, 1963   E. A. STALKER   3,083,446
ROTOR CONSTRUCTION
Original Filed June 14, 1950   2 Sheets-Sheet 2

INVENTOR.
Edward A. Stalker
ATTORNEYS 3,083,446
ROTOR CONSTRUCTION
Edward A. Stalker, Bay City, Mich., assignor to Stalker Corporation, a corporation of Michigan
Original application June 14, 1950, Ser. No. 167,981, now Patent No. 2,772,851, dated Dec. 4, 1956. Divided and this application Nov. 28, 1956, Ser. No. 624,891
1 Claim. (Cl. 29—156.8)

The invention relates to rotors and blade structures for use in machines such as compressors, turbines, torque converters and the like wherein there is an interchange of energy between fluid and blades.

This application is a division of my application Ser. No. 167,981 entitled, "Rotor Construction" filed June 14, 1950 in which division was required, now Patent No. 2,772,851.

An object of the invention is to provide a means of repairing bladed rotors of the type fabricated from sheet metal.

Another object is to provide a rotor construction adapted to fabrication from sheet metal pressings commonly called stampings.

Still another object is to provide blades formed from sheet metal of airfoil sections having small nose radii.

Other objects will appear from the description, drawings and claim.

The above objects are accomplished by the means illustrated in the accompanying drawings in which—

FIG. 1 is a fragmentary perspective of a rotor partly in section as initially formed but with one of the blades cut out to enable a replacement thereof to be made;

FIG. 2 is a fragmentary axial cross section through the rotor of FIG. 1 with a repair blade installed on line 2—2 of FIG. 1 with the repair blade being shown in elevation;

FIG. 3 is a fragmentary axial view of the rotor of FIG. 2;

FIG. 4 is a section along line 4—4 in FIG. 2;

FIG. 5 is a section along line 5—5 in FIGS. 2 and 9;

Figure 6:
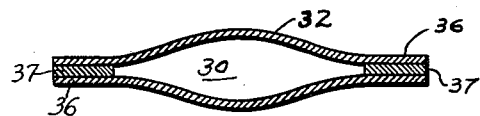
FIG. 6 is a section along line 6—6 in FIGS. 2 and 9.
Figure 7:
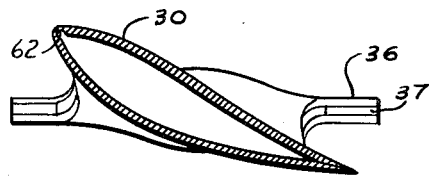
FIG. 7 is a spanwise view of a blade along line 7—7 in FIG. 9.
Figure 8:
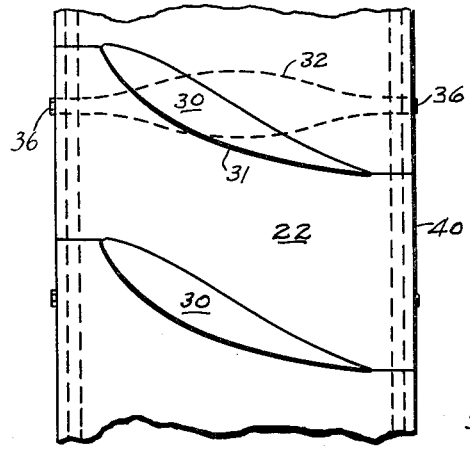
FIG. 8 is a radial view of a fragment of the hub peripheral surface of the rotor of FIG. 2.

In my U.S. Patent No. 2,649,243 entitled, "Axial Flow Compressor Construction," issued August 18, 1953, I have disclosed a blade structure adapted as a rotor, fabricated from sheet metal and substantially of integral construction for their blades and blade supporting plates.

The rotors disclosed herein are axial flow rotors. That is they have blades which receive the flow transversely across the leading edges along chordwise sections preferably of airfoil shape, and the spans of the blades extend radially. That is the leading and trailing edges are directed radially.

In the event that a blade is damaged it is desirable that a method of replacing the blade be available. The present invention provides a form of blade which can be used to replace a damaged blade. The blade structure is also adapted to the fabrication of a complete rotor of such blades.

Rotating machinery requiring a high power output for the size of the machine turn at very high rates of speed. Their stress problems are more severe than low speed machinery. The dividing line between low and high speed machinery may be taken at those blade tip speeds where ordinary materials of construction such as ordinary carbon steels will not suffice. Accordingly rotors whose blade tip speeds exceed 500 feet per second are classified as high speed machines.

Referring now to the drawings FIG. 1 shows a rotor 10 comprised of a group of sheet metal plates indicated generally as hub plates. This group comprises the blade supporting plates 14 and the side plates or disks 20. The blade parts 12 and 13 are integral with the blade supporting plates 14 and form blades 15. The hub covering segments between blades are designated 22 and constitute a rim closure means including the rim means which extends from blade to blade and from side disk to side disk. The plates and the rim closure means constitute parts of the hub structure 16 which also includes suitable hub rings 17 and 18 for fixing the plates to the driving shaft 19.

Where a blade is damaged it may be cut out and a new blade 30 substituted as shown in FIG. 2. New rim closures then are used to replace those removed. As shown in FIGS. 2–8 the blade has the blade body 31 of airfoil section and the root body 32 twisted or pitched to be transverse to the side plates 20. Thus if the slots 34 are cut radially inward in the hub plates the blade flanges 36 can be inserted from the periphery. The projections or flanges 36 of the blades together with the insert 37 then nest in the slots 34. The flanges 40 of the rim closure 22 are bonded to the side disks and cover and extend across the slots 34 to carry the peripheral stress from one side of the slot to the other. The flanges and side disks form a disk means capable of carrying the peripheral stress in the material at the radially inward and outward sides of the slots or openings for the blade projections. The flanges 36 and 40 are bonded to the side plates by soldering or welding or some such fusing process, preferably by copper, silver solder or other high melting point solder. The covering segments are also soldered to the blades. As shown in FIGS. 2 and 3 the projections 36 protrude out of the side plates below the flanges 40 and bear thereon for support in addition to the bonded joints.

In high temperature soldering where strength of the joint must be assured it is important that the joint be accessible to visual inspection. That is difficult to do but is provided in the present invention.

By overlapping or faying the sheet metal parts they can be soldered together so that the soldered surfaces are subject principally to shear stress and the parts can be light in weight for adequate strength.

In order to carry the centrifugal loads of the blades and rim closures and be of light weight, the side plates are made straight as seen in axial section.

Figure 10:
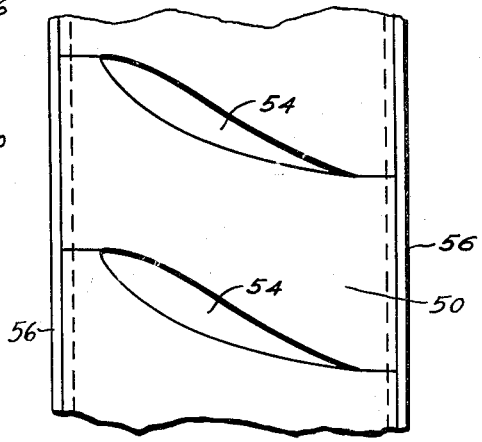
FIG. 10 is a radial view of a fragment of the hub peripheral surface of the rotor of FIG. 9 disclosing the blade openings.
Figure 9:
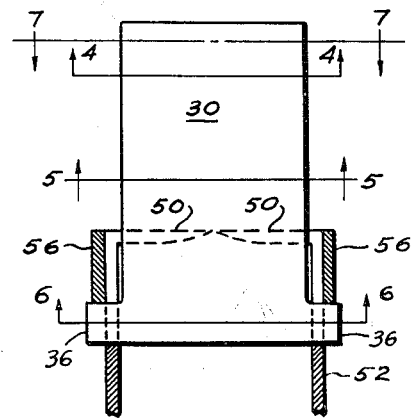
FIG. 9 is a fragmentary axial section through another form of rotor.

A complete rotor may be constructed of blades like 30 and this may be quite economical for varying quantities of production. An axial fragmentary section of such a rotor is shown in FIG. 9. In this structure the rim closures are formed by the peripheral rim flanges 50 of the supporting side plates 52. The flanges are slotted to receive the blades as shown in FIGS. 9 and 10 where the openings 54 conform to the blade contour. Rings 56 extend about the side plates 52 above the blade flanges 36.

Figure 11:
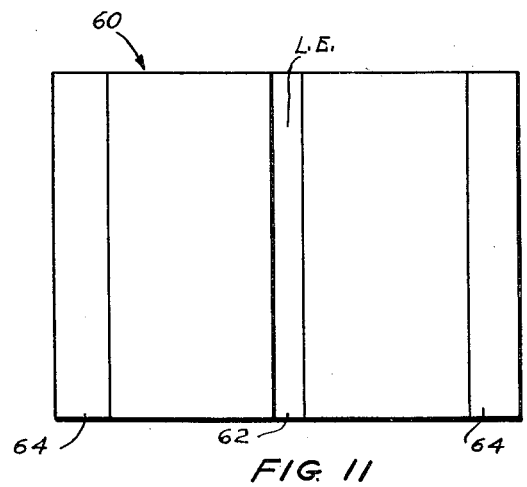
FIG. 11 is a development of the sheet from which a blade is fabricated.
Figure 12:
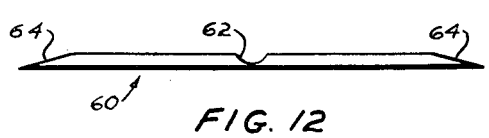
FIG. 12 is an end view of the sheet of FIG. 11.

The blades are made from a sheet of metal 60, alloy steel for instance, by folding about the leading edge L.E. and bonding the two side walls together at the trailing edge T.E. When very thin airfoil sections are used it is difficult to provide the small radius at the leading edge. In the present invention the surface of sheet metal which is to form the leading edge or nose wall is thinned, as by rolling for instance, along a narrow spanwise band or groove 62, FIGS. 4, 11 and 12. The edges of the nose groove are closed together in the formed condition of the blade adapting them to be secured with solder. At the same time the edges of the sheet may be given the taper 64 to provide a sharp trailing edge when the sheet edges are lapped. It is simpler and far more economical to provide the taper on the sheet than to finish the individual blades after the edges are bonded together. The bonding is preferably done by soldering, preferably furnace soldering. Silver solder, copper, or some of the still higher melting type solders may be used.

In contemporary practice the blades and their hubs are so heavy that a heavy rim on the rotor disk is necessary to carry the centrifugal loads of the blades. For instance in many blades the blade root fitting weighs as much or more than the blade. Furthermore the blade root fitting is bulky, requiring further increase in the size of the disk rim. Then the thickness of the disk adjacent to the rim has to be made heavy to carry not only the blade loads but also the extra load from the rim made heavy by the type of blade and its root fitting and effects thereof.

If proper proportions are used a rotor fabricated according to this invention from sheet metal pressings can be lighter by about 40% than a machined rotor following contemporary practice. That is if the blade is made with a wall of limited thickness, as is practical according to this invention, and the blade is then attached without a heavy blade root fitting or comparable means requiring a disk rim, then the disk rim can be dispensed with and the disk itself can be very thin such as pieces of sheet metal.

In this invention the blades or blade walls are attached directly to the load carrying disks or plates of the rotor thus eliminating the blade root fittings, and the heavy disk rim.

The blade wall thickness can be of the order of 1.5% of the blade chord length or less, preferably less than about 1% of the chord length.

Thus the blade wall thickness can be of the order of 0.020 in. or less depending on the size of the blade. For instance a blade having a root chord of 2 in. can readily employ a wall thickness of 0.018 in. If such a blade is fixed to rotor side plates by brazing as described herein, no disk or plate rim is necessary. The thin walled blade and the light rim or absence of a rim, makes possible side disks or plates whose thickness aggregate a total thickness less than 10 times the blade wall thickness.

The thickness of the portions of the plates where the blades are attached need not be greater than the portion next adjacent thereto radially inward therefrom.

When the blades are made hollow of thin sheet metal and thereby of limited weight the blade bases may be omitted, and the rim structure can be of limited weight and thickness comparable to the blade wall thickness; the disks can consequently be made of limited thickness and weight, and all these parts will be able to sustain their own centrifugal load and the centrifugal loads accumulated on them inward from the tips of the blades with sheet metal thickness of the order of the blade wall thickness.

It will thus be clear that the blades, the rim closures and the disks cooperate to make the rotor as a whole of desirably low weight.

This invention refers to compressor rotors for elastic fluids. The bladed wheels making up such rotors have a substantial static pressure rise along the flow passages between blades from leading to trailing edges thereof. To provide for this pressure rise the passages must have closed peripheral surfaces extending between the blades and from the leading to the trailing edges thereof. At the radially inner ends of the passages the rim segments sustain the static pressure while at the outer ends the case performs this function.

Furthermore, since there is a substantial pressure rise from front to rear of the wheel the ratio of the hub radius to the blade tip radius is relatively large, of the order of 0.5 or more and preferably 0.6 or more, so that the pressure difference between front and rear sides can be sustained without a return flow at the hub. For a similar reason the blades are peripherally close together, preferably about one chord length or less apart.

The joining of the sheet metal blades and the sheet metal hub structure is done by soldering, preferably furnace soldering simultaneously on all joints. These are such that the joint is exposed to view so that the assembly is inspectable after removal from the furnace.

The process of producing the rotors comprises the steps of cutting peripherally spaced openings in front and rear side plates adjacent their perimeters leaving a substantial amount of metal between the radially outer edges of the hole and the plate perimeter, forming rim flanges on the disks extending axially of the disks, cutting notches in the flanges of one disk corresponding in contour to the chordwise contour of the forward portions of the blades, and in the flange of the other disk corresponding in contour to the chordwise contour of the complementary or rearward portions of the blades, inserting the chordwise extending projections at one side of a plurality of blades each into said openings of a said side disk. The other side disk is then placed against the free sides of the blades with their projections each in an opening of the latter disk. The blades are positioned in the notches of the rim flanges. These notches are complementary and form openings corresponding closely to the blade contours at the rim flanges. Solder is placed at the surfaces to be bonded together. Then the assembly of parts is heated to soldering temperatures substantially uniformly throughout as in a furnace to complete the bonding of the parts together by solder.

Where the rim means comprises a plurality of segments the process omits the forming of the flanges and instead the individual rim segments are placed in position between the blades.

While I have illustrated specific forms of the invention, it is to be understood that variations may be made therein and that I intend to claim my invention broadly as indicated by the appended claim.

What is claimed is:

The method of forming an axial flow blade for compressors, turbines and the like from a sheet of metal comprising the steps of thinning the sheet along a narrow strip extending spanwise forming a narrow smoothly rounded groove on one side of said sheet, thinning said sheet on the same side upon which said groove is formed spanwise along its edges forming chordwise tapered edges, folding said sheet along said narrow groove to bring the adjacent edges of said groove into proximity and said tapered edges into registration one with the other to form a blade of airfoil cross section having a relatively sharp leading edge formed on the sheet adjacent said groove and a relatively sharp trailing edge formed at the junction of said tapered edges, and soldering said groove edges and said tapered edges together.

(References on following page)

References Cited in the file of this patent

UNITED STATES PATENTS

| | | |
|---|---|---|
| 1,603,966 | Lorenzen | Oct. 19, 1926 |
| 1,876,067 | Lorenzen | Sept. 6, 1932 |
| 2,097,927 | Klemp | Nov. 2, 1937 |
| 2,123,842 | Cox | July 12, 1938 |
| 2,143,467 | Allard | Jan. 10, 1939 |
| 2,345,918 | Dahlstrand | Apr. 4, 1944 |
| 2,475,772 | Allen et al. | July 12, 1949 |
| 2,559,131 | Oestrich et al. | July 3, 1951 |
| 2,654,143 | Hoesch et al. | Oct. 6, 1953 |
| 2,699,598 | Daugherty | Jan. 18, 1955 |
| 2,764,803 | Lampton et al. | Oct. 2, 1956 |
| 2,831,244 | Adell | Apr. 22, 1958 |
| 2,912,222 | Wilkes | Nov. 10, 1959 |